(12) United States Patent
Noehl et al.

(10) Patent No.: US 8,475,326 B2
(45) Date of Patent: Jul. 2, 2013

(54) OUTER PLATE CARRIER

(75) Inventors: Oliver Noehl, Buehlertal (DE); Michael Schlosser, Bietigheim (DE); Thomas Gutt, Buehl (DE); Frank Feurer, Achern-Grossweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/523,400

(22) Filed: Jun. 14, 2012

(65) Prior Publication Data

US 2012/0267211 A1    Oct. 25, 2012

Related U.S. Application Data

(63) Continuation of application No. PCT/DE2010/001383, filed on Nov. 24, 2010.

(30) Foreign Application Priority Data

Dec. 17, 2009   (DE) .......................... 10 2009 058 622

(51) Int. Cl.
*F16H 57/08*   (2006.01)
(52) U.S. Cl.
USPC ........................................................ 475/331

(58) Field of Classification Search
USPC ............................................ 475/331; 192/115
See application file for complete search history.

(56) References Cited

U.S. PATENT DOCUMENTS

| | | | | |
|---|---|---|---|---|
| 3,610,385 | A | * | 10/1971 | Dolata .......................... 192/115 |
| 5,299,677 | A | * | 4/1994 | Caillaud et al. ............... 277/565 |
| 2006/0042903 | A1 | | 3/2006 | Oki et al. |
| 2010/0304918 | A1 * | | 12/2010 | Burgman et al. ............. 475/331 |

FOREIGN PATENT DOCUMENTS

| | | |
|---|---|---|
| DE | 10309566 | 6/2004 |
| DE | 102006009969 | 9/2007 |
| EP | 1008404 | 6/2000 |
| EP | 1609654 | 12/2005 |

* cited by examiner

*Primary Examiner* — Edwin A Young
(74) *Attorney, Agent, or Firm* — Simpson & Simpson, PLLC

(57) ABSTRACT

An outer plate carrier, including a cup-shaped embodied carrier plate (110) comprising a cylinder-shell shaped cylindrical section (130) and a circular-disk shaped bottom section (120). The bottom section (120) of the carrier plate (110) carries a cup-shaped hub section (140), arranged centrally. The cup-shaped hub section includes a cylindrical-shell shaped hub jacket (160) and a circular-disk shaped hub bottom (150). The hub bottom (150) has a smaller diameter than the bottom section (120) of the carrier plate (110). The hub bottom (150) is continuous and embodied in one piece with the carrier plate (110).

11 Claims, 4 Drawing Sheets

OUTER PLATE CARRIER

CROSS-REFERENCE TO RELATED APPLICATIONS

This application is filed under 35 U.S.C. §120 and §365(c) as a continuation of International Patent Application No. PCT/DE2010/001383 filed on Nov. 24, 2010, which application claims priority from German Patent Application No. 10 2009 058 622.9 filed Dec. 17, 2009, which applications are incorporated herein by reference in their entirety.

FIELD OF THE INVENTION

The present invention relates to an outer plate carrier for a clutch, for example, a clutch in a transmission.

BACKGROUND OF THE INVENTION

Outer plate carriers are essential components of hydraulic clutches and brakes, as for example used in motor vehicles. For example, an outer plate carrier represents a clutch inlet, transmitting a torque from an internal combustion engine to the plates of the outer plate carrier. Appropriate multi-disk clutches are known for example from DE 103 09 566 A1.

Outer plate carriers of the prior art comprise a clutch basket and a connection part, with an inlet gearing being embodied on a hub area. The basket and the connection part are connected to each other via engaging gears and a circlip. The hub comprises a forging blank processed in a cutting fashion, which is welded to a connection part formed from sheet metal. This embodiment is disadvantageous by its high production costs. Particularly the production of the forging blank is expensive.

BRIEF SUMMARY OF THE INVENTION

The objective of the present invention therefore comprises to provide an improved outer plate carrier.

The outer plate carrier according to the invention comprises a cup-shaped carrier plate with a cylindrical-shell shaped cylinder section and a circular-disk shaped bottom section. The bottom section of the carrier plate comprises a cup-shaped hub section, arranged centrally, with a cylinder-shell shaped hub jacket and a circular-disk shaped hub bottom. The hub bottom has a smaller diameter than the bottom section of the carrier plate. The hub bottom is continuous. Additionally the support plate is embodied in one piece. Advantageously this outer plate carrier can be produced very easily and cost-effectively.

In one embodiment, a cylinder-shell shaped geared sleeve, provided radially outwardly with an outer gearing, is arranged radially outwardly on the hub material. Advantageously the geared sheath may show a different hardness than the carrier plate of the outer plate carrier.

In a first embodiment of the outer plate carrier, the geared sheath is welded to the hub shell and/or an axial stop of the bottom section of the carrier plate. Advantageously here a connection can be established in a simple and cost-effective manner between the geared sheath and the hub shell.

In an alternative embodiment of the outer plate carrier, the geared sheath comprises radially inwardly an inner gearing and is connected by way of caulking to the hub shell. Advantageously by this connection technology any change of the gearing of the geared sleeve can be avoided, caused by excessive introduction of heat. In one embodiment, the geared sheath comprises at its end facing the bottom section a chip chamber embodied as a circumferential recess. Advantageously, this chip chamber then can accept chips of the geared sheath developing during the caulking process.

In one embodiment of the outer plate carrier, the outer gears of the geared sheath are rolled. Here the cold hardening of the material of the geared sheath can be used, advantageous in reference to cutting production processes.

In an alternative embodiment of the outer plate carrier, the outer gears of the geared sleeve are axially extruded. Advantageously here the cold hardening of the material of the geared sleeve can be used.

In one embodiment, the geared sheath shows a greater hardness than the carrier plate. Advantageously, this greater hardness minimizes the wear and tear of the geared sheath.

In one embodiment, the carrier plate comprises a cylinder-shell shaped sealing area in a transition area between the bottom section and the hub section. A cylinder-shell shaped sealing sheath is pressed radially outwardly onto the sealing area. Advantageously it is more cost-effective to use such a sealing sleeve than to cure the hub area of the carrier plate. Additionally, when a sealing sheath is used any potentially harmful accumulation of carbon in the welding zones of the hub area of the support plate can be ignored.

In one embodiment, the outer plate carrier is embodied for the use in hydraulic clutches of a transmission of a motor vehicle.

In one embodiment, the sealing sheath is extruded in a non-cutting fashion and carbonized. The carrier plate is, for example, deep-drawn and may be made from steel of the quality DD12, for example. The carrier plate may be coated, such as nitro-carbureted, after the necessary welding processes. When the geared sheath is welded to the hub shell and/or an axial stop of the bottom section of the carrier plate preferably laser-welding is used. Even in case the geared shell is connected to the hub material by way of caulking one or more welding points might be provided between the geared shell and the hub shell for an axial securing of the geared sheath. The geared sheath is preferably made from steel of the quality 16MnCr5 and is hardened to the tensile strength of 650 to 750 N/mm². The described plate carrier may also be used in a hydraulic brake.

BRIEF DESCRIPTION OF THE SEVERAL VIEWS OF THE DRAWING

In the following, the invention is explained based on the figures.

DETAILED DESCRIPTION OF THE INVENTION

The outer plate carrier 100 may for example be used in a hydraulic clutch of a transmission of a motor vehicle embodied as a multi-disk clutch. The use of the outer plate carrier 100 in a hydraulic brake of a motor vehicle is also possible.

Figure 1:
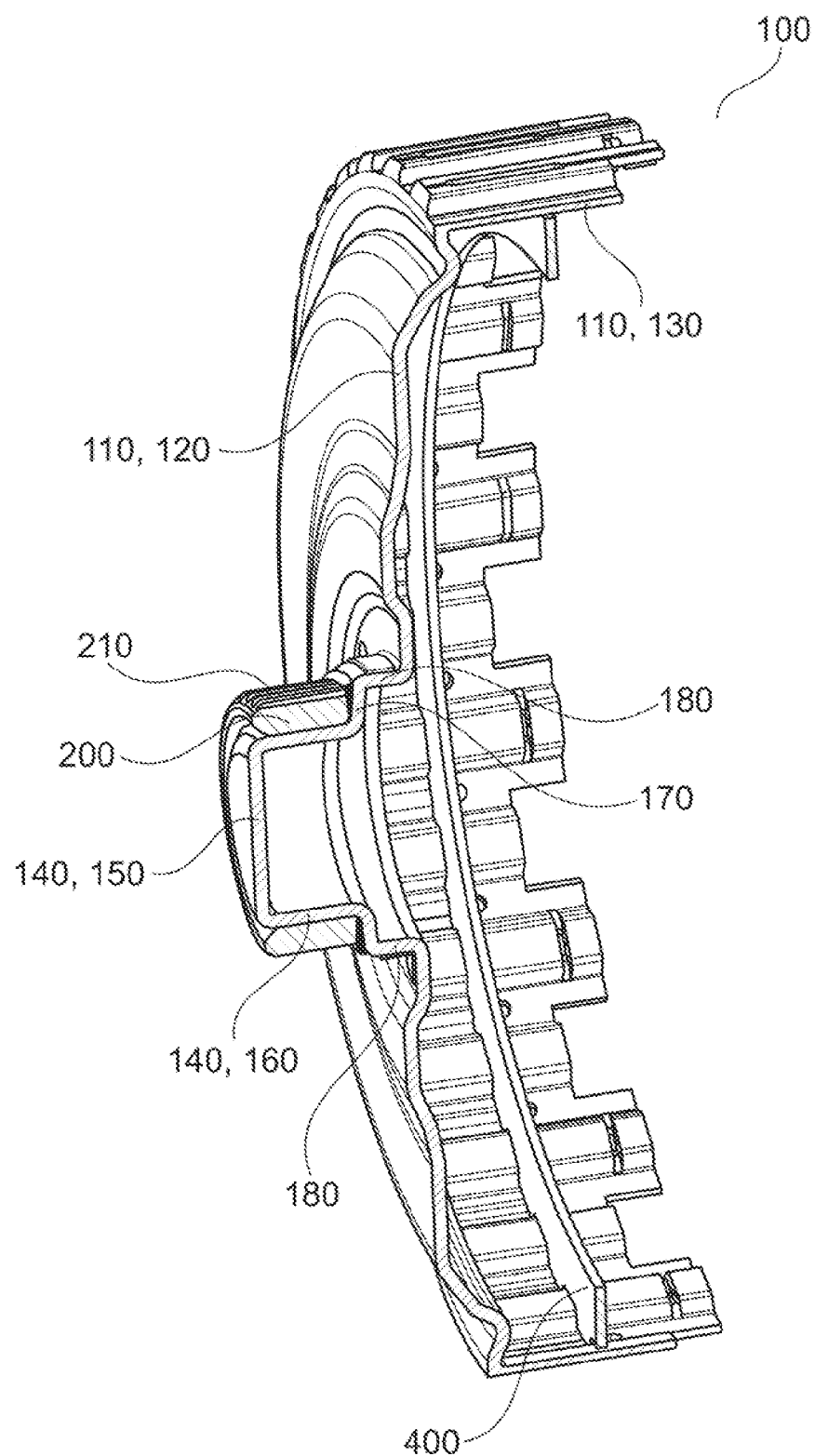
FIG. 1 is a schematic and partially opened, perspective illustration of an outer plate carrier.

FIG. 1 is a schematic and partially opened, perspective illustration of outer plate carrier 100. The outer plate carrier 100 comprises a cup-shaped embodied carrier plate 110 with a circular-disk shaped bottom section 120 and a cylindrical-shell shaped cylinder section 130. The carrier plate 110 may be made from a material with low stability, for example steel of the quality DD12. The carrier plate 110 may be produced by way of deep-drawing, for example.

The cylinder section 130 of the carrier plate 110 comprises at its radially outer surface a plurality of inner suspended plates, which are embodied according to prior art and thus require no further explanation. The cylinder section 130 of the carrier plate 110 comprises a circumferential plate gearing 400 according to prior art.

The carrier plate 110 further comprises a cup-shaped embodied hub section 140 with a circular-disk shaped hub bottom 150 and a cylindrical-shell shaped hub jacket 160. The cup-shaped hub section 140 is arranged in the center of the circular-disk shaped bottom section 120 of the carrier plate 110 and points in the direction opposite the cylinder section 130 of the carrier plate 110. In the transition area between the hub jacket 160 of the hub area 140 and the bottom section 120 of the carrier plate 110 a circular-disk shaped axial stop 170 and a cylindrical-shell shaped sealing area 180 are embodied. The axial stop 170 is here approximately parallel in reference to the bottom section 120 of the carrier plate 110 and oriented towards the hub bottom 150 of the hub area 140. According to the present exemplary embodiment, the sealing area 180 is oriented concentrically in reference to the cylinder section 130 of the carrier plate 110 and the hub jacket 160 of the hub area 140. The sealing area 180 shows a greater diameter than the hub jacket 160 and a smaller diameter than the cylinder section 130. The other areas of the bottom sections 120 do not necessarily need to be embodied completely planar. The hub area 140 is continuous in the area of the hub bottom 150 and the hub jacket 160.

A cylindrical-shell shaped gearing sheath 200 is arranged radially outwardly on the hub jacket 160. The geared sheath 200 comprises radially outwardly an outer gearing 210. The outer gearing 210 may for example comply with the standard DIN 5480-W50×1×30×48 8f. The outer gearing 210 may be rolled or axially extruded. For the production of the outer gearing 210 of the geared sheath 200 the ability for cold forming the material of the geared sheath 200 is utilized. The increased stability by the cold formation may here amount from 10% to 30%. The axial length of the geared sheath 200 is approximately equivalent to the axial length of the hub jacket 160.

Figure 2:
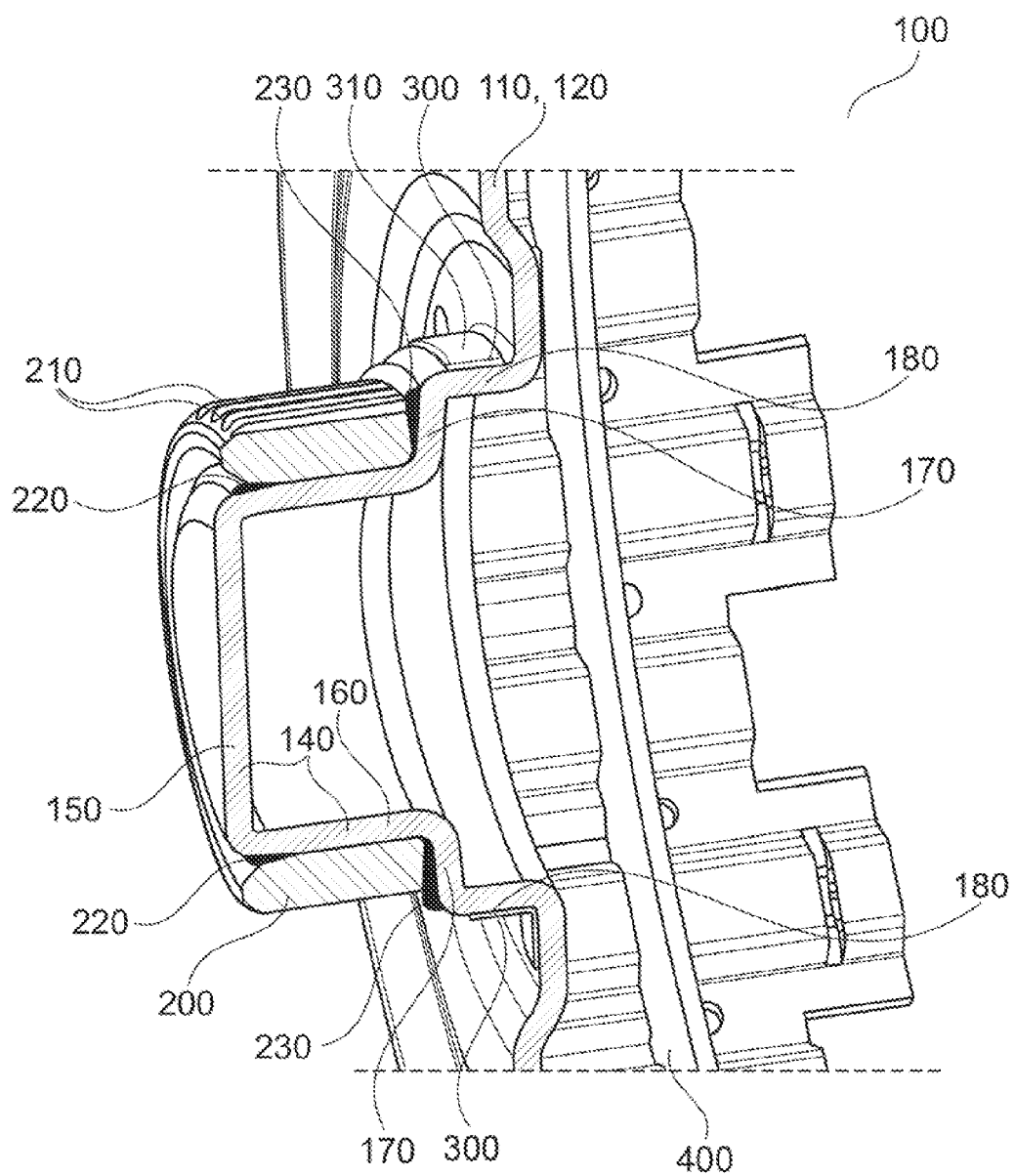
FIG. 2 is a detail of the outer plate carrier of FIG. 1.

FIG. 2 is a detail of the outer plate carrier of FIG. 1. It is discernible in FIG. 2 that the radially inner surface of the geared sheath 200 is essentially embodied smoothly and contacts the surface of the hub jacket 160. The geared sheath 200 is connected to the carrier sheath 110 by way of welding. At the axial end of the geared sheath 200, facing away from the axial stop 170, a hub bottom 150 provides via a circumferential perimeter welding 220 a connection between the geared sheath 200 and the hub jacket 160 of the hub area 140. At the end of the geared sheath 200, facing the axial stop 170, a circumferential facial welding 230 provides a connection between the geared sheath 200 and the axial stop 170 of the carrier plate 110. The circumferential welding 220 or the facial welding 230 may optionally be omitted, though. The circumferential welding 220 and the facial welding 230 are preferably produced by laser welding.

FIG. 2 additionally shows that an annular sealing sheath 300 is arranged about the cylindrical-shell shaped sealing area 180 of the carrier plate 110. The sealing sheath 300 is embodied as a thin metal band, with its axial length being approximately equivalent to the length of the sealing area 180. The radially outward surface of the sealing sheath 300 forms a sealing surface 310. The sealing surface 310 preferably comprises a strong hardness and little roughness. The sealing sheath 300 is pressed upon the sealing area 180 of the carrier plate 110. The sealing sheath 300 is preferably extruded in a non-cutting fashion and has been carbonized. Advantageously, by the use of the sealing sheath 300 any carbonizing of the sealing area 180 of the carrier plate 110 can be waived. Additionally, a harmful accumulation of carbon that may develop in the area of the welding zones during the implementation of the circumferential welding 220 and the facial welding 230 can be ignored.

Figure 3:
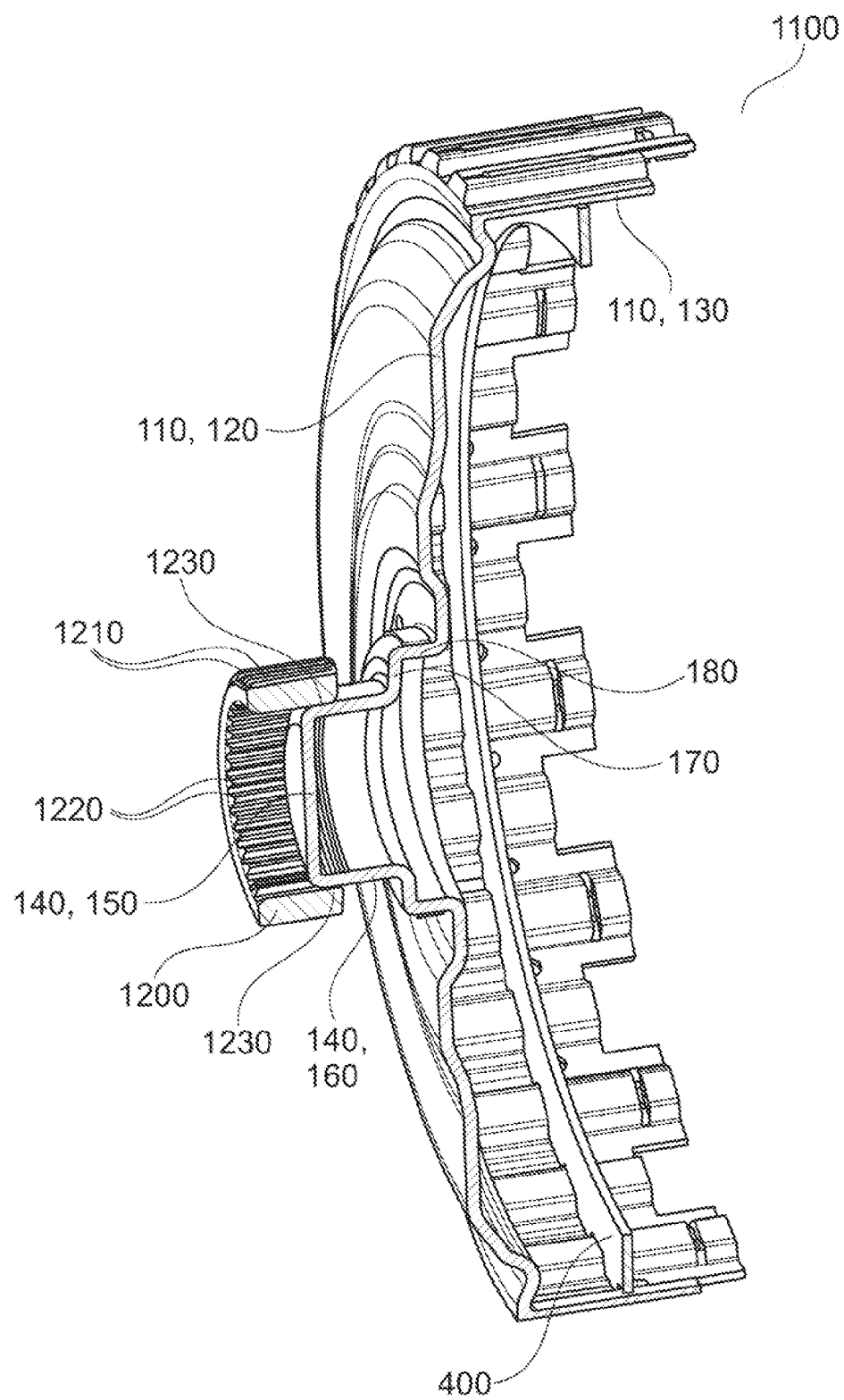
FIG. 3 is a schematic and partially opened, perspective illustration of an outer plate carrier.

FIG. 3 shows a perspective cross-section of an outer plate carrier 1100. Here, elements equivalent to the first embodiment of FIGS. 1 and 2 were marked with the reference characters already introduced, and are not described anew in the following. In the outer plate carrier 1100 of FIG. 3, instead of the geared sheath 200, a differently embodied geared sheath 1200 is provided at the hub jacket 160 of the hub area 140 of the carrier plate 110, which however in the illustration of FIG. 3 has not yet been fastened to the hub area 140. The geared sheath 1200 is once more embodied in a cylindrical-shell shaped fashion and comprises an axial length approximately equivalent to the length of the hub jacket 160. The radially outward jacket surface of the geared sheath 1200 comprises an exterior gearing 1210, which may be embodied like the exterior gearing 210 of the geared sheath 200. Additionally, the radially inner jacket surface of the geared sheath 1200 may show an inner gearing 1220. The teeth of the inner gearing 1220 are oriented parallel in reference to the axial direction of extension of the geared sheath 1200. Additionally, the geared sheath 1200 is provided at its end facing the bottom section 120 of the carrier plate 110 as a chip chamber 1230 embodied as a circumferential recess. The chip chamber 1230 may also be omitted in a simplified embodiment.

Figure 4:
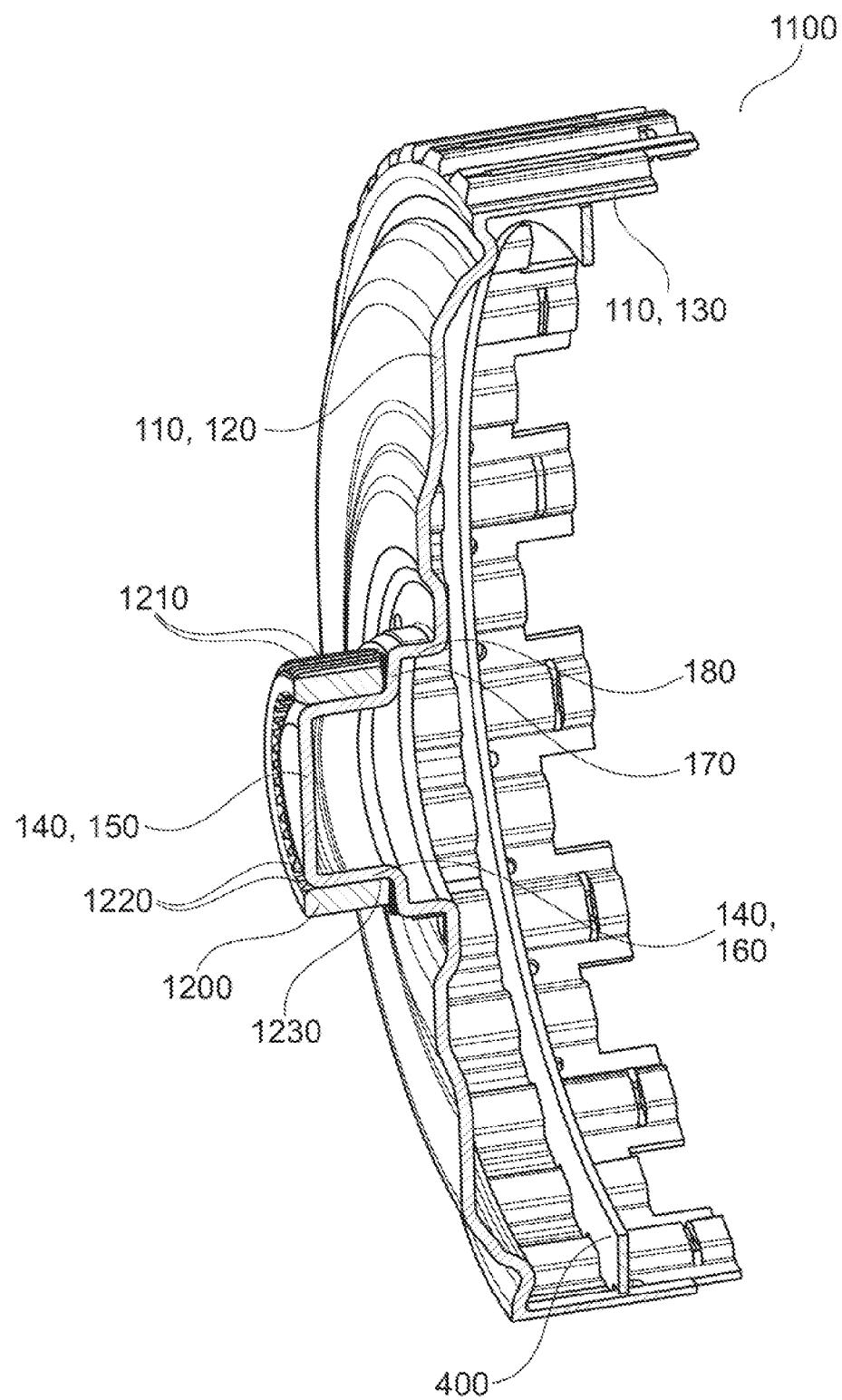
FIG. 4 is another view of the outer plate carrier of FIG. 3.

FIG. 4 shows another illustration of the outer plate carrier 1100 of FIG. 3. In FIG. 4 the geared sheath 1200 was connected to the hub jacket 160 of the hub area 140 of the carrier plate 110 by way of caulking. The inner diameter of the cylindrical-shell shaped geared sheath 1200 is approximately equivalent to the radial diameter of the hub area 140. When the geared sheath 1200 is pressured in the axial direction upon the hub area 140 of the carrier plate 110 the inner gearing 1220 of the geared sheath 1200 cuts a counter gearing into the hub jacket 160 of the hub area 140 matching the inner gearing 1220. Here, chips developing from the material of the hub jacket 160 are accepted in the chip chamber 1230. The inner gearing 1220 and the counter gearing formed in the hub jacket 160 by the inner gearing lead to a tight fit of the geared sheath 1200 on the hub jacket 160. In particular, the gearing generates a protection of the geared sheath 1200 from any distortion in the circumferential direction of the hub jacket 160. In the axial direction the geared sheath 1200 can be secured by one or more additional welding points between the geared sheath 1200 and the carrier plate 110. The fastening of the geared sheath 1200 described in FIGS. 3 and 4 on the carrier plate 110 by way of caulking shows the advantage in reference to the fastening described in FIGS. 1 and 2 of the geared sheath 200 at the carrier plate 110 by welding connections 220, 230 that due to the lesser introduction of heat any considerable change of the outer gearing 1210 is minimized.

The geared sheath 200, 1200 preferably shows a greater hardness than the carrier plate 110. The geared sheath 200, 1200 may for example be made from steel of the quality 16MnCr5 and cured for the required hardness level.

The carrier plate 110 may be coated to avoid wear and tear at the plate gearing 400, for example by way of nitro-carburetion. Preferably the coating occurs after the welding connections 220, 230 and/or the point-welding connection have been implemented to fasten the geared sheath 1200, however prior to the sealing sheath 300 being pressed thereon. This way any covering of the welding zones is not necessary.

LIST OF REFERENCE CHARACTER

100 outer plate carrier
110 carrier plate
120 bottom section
130 cylinder section
140 hub section
150 hub bottom
160 hub jacket
170 axial stop
180 sealing area
200 geared sheath
210 outer gearing
220 circumferential welding
230 facial welding
300 sealing sheath
310 sealing area
400 plate gearing
1100 outer plate carrier
1200 geared sheath
1210 outer gearing
1220 inner gearing
1230 chip chamber

What we claim is:

1. An outer plate carrier, comprising a cup-shaped carrier plate (110) comprising a cylinder-shell shaped cylindrical section (130) and a circular-disk shaped bottom section (120), wherein:
   the bottom section (120) of the carrier plate (110) carries a cup-shaped hub section (140), arranged centrally;
   the cup-shaped hub section includes a cylindrical-shell shaped hub jacket (160) and a circular-disk shaped hub bottom (150);
   the hub bottom (150) has a smaller diameter than the bottom section (120) of the carrier plate (110); and,
   the hub bottom (150) is continuous and embodied in one piece with the carrier plate (110).

2. The outer plate carrier according to claim 1, wherein:
   a cylindrical-shell shaped geared sheath (200, 1200) is arranged radially outwardly on the hub jacket (160); and,
   the geared sheath (200, 1200) comprises an outer gearing (210, 1210) radially outwardly.

3. The outer plate carrier according to claim 2, wherein the geared sheath (200) is welded to the hub jacket (160) and an axial stop (170) of the bottom section (120) of the carrier plate (110).

4. The outer plate carrier according to claim 2, wherein the geared sheath (200) is welded to the hub jacket (160) or an axial stop (170) of the bottom section (120) of the carrier plate (110).

5. The outer plate carrier according to claim 2, wherein the geared sheath (1200) comprises an inner gearing (1220) radially inwardly with the geared sheath (1200) and connected to the hub jacket (160) by way of caulking.

6. The outer plate carrier according to claim 5, wherein the geared sheath (1200) comprises at its end facing the bottom section (120) radially inwardly a chip chamber (1230) embodied as a circumferential recess.

7. The outer plate carrier according to claim 2, wherein the outer gearing (210, 1210) of the geared sheath (200, 1200) is rolled.

8. The outer plate carrier according to claim 2, wherein the outer gearing (210, 1210) of the geared sheath (200, 1200) is axially extruded.

9. The outer plate carrier according to claim 2, wherein the geared sheath (200, 1200) has greater hardness than the carrier plate (110).

10. The outer plate carrier according to claim 2, wherein:
    the carrier plate (110) comprises a cylinder-shell shaped sealing area (180) in a transition area between the bottom section (120) and the hub section (140); and,
    the cylinder-shell shaped sealing sheath (300) is pressed radially outwardly onto the sealing area (180).

11. The outer plate carrier according to claim 2, wherein the outer plate carrier (100, 1100) is embodied for the use in hydraulic clutches of a transmission of a motor vehicle.

* * * * *